No. 711,488. Patented Oct. 21, 1902.
L. H. FLANDERS.
SUPPORTING AND LIFTING MECHANISM FOR SECONDARY BATTERY PLATES.
(Application filed Feb. 24, 1902.)
(No Model.) 2 Sheets—Sheet 1.

Fig. 4ª.

WITNESSES:
C. L. Belcher
Birney Hines

INVENTOR
Louis H. Flanders
BY
ATTORNEY

No. 711,488. Patented Oct. 21, 1902.
L. H. FLANDERS.
SUPPORTING AND LIFTING MECHANISM FOR SECONDARY BATTERY PLATES.
(Application filed Feb. 24, 1902.)
(No Model.) 2 Sheets—Sheet 2.

WITNESSES:
C. L. Belcher
Birney Hines

INVENTOR
Louis H. Flanders
BY
Wesley Sloan
ATTORNEY

UNITED STATES PATENT OFFICE.

LOUIS H. FLANDERS, OF WILKINSBURG, PENNSYLVANIA, ASSIGNOR TO THE WESTINGHOUSE MACHINE COMPANY, A CORPORATION OF PENNSYLVANIA.

SUPPORTING AND LIFTING MECHANISM FOR SECONDARY-BATTERY PLATES.

SPECIFICATION forming part of Letters Patent No. 711,488, dated October 21, 1902.

Application filed February 24, 1902. Serial No. 95,337. (No model.)

*To all whom it may concern:*

Be it known that I, LOUIS H. FLANDERS, a citizen of the United States, residing at Wilkinsburg, in the county of Allegheny and State of Pennsylvania, have invented a new and useful Improvement in Supporting and Lifting Mechanism for Secondary - Battery Plates, (Case No. 1,038,) of which the following is a specification.

My invention relates to secondary batteries, and especially to means for supporting the plate-electrodes of such batteries in the tanks in which they are used and for lifting the plates from said tanks for cleaning or repairs or for the purpose of introducing new plates.

The object of my invention is to provide an efficient and relatively inexpensive means for securing the above-mentioned results; and it is illustrated in the accompanying drawings, in which—

Figure 1:
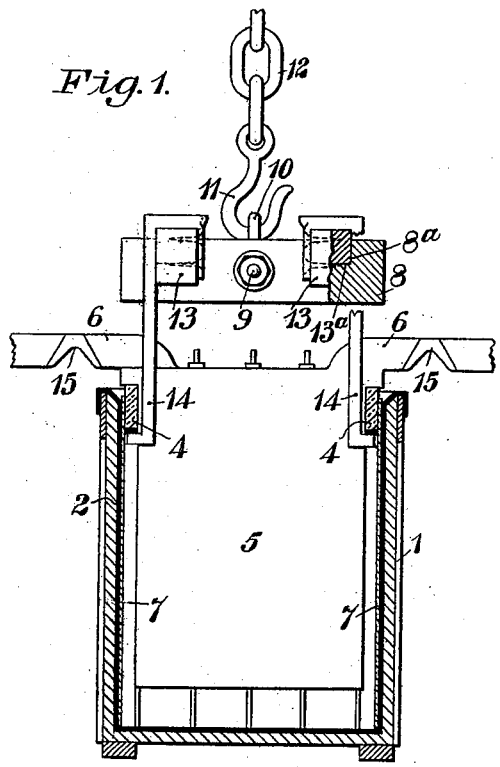
Figure 3:
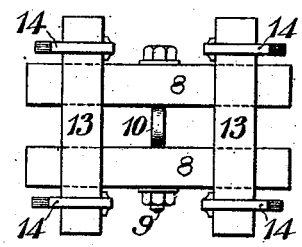
Figure 5:
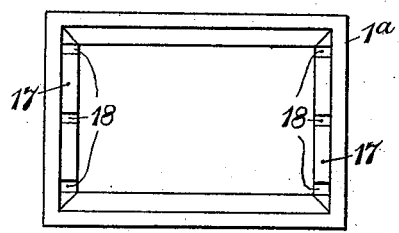
Figure 2:
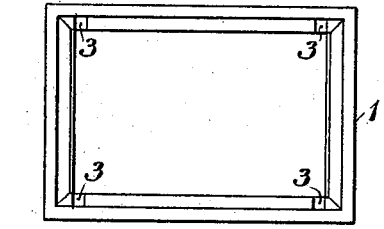
Figure 4:
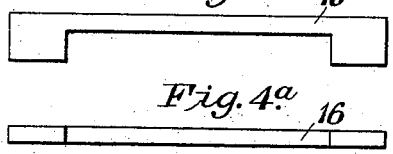
Figure 6:
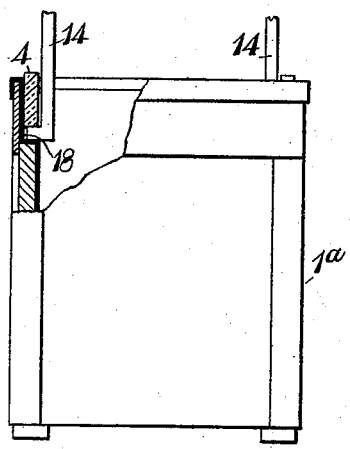
Figure 7:
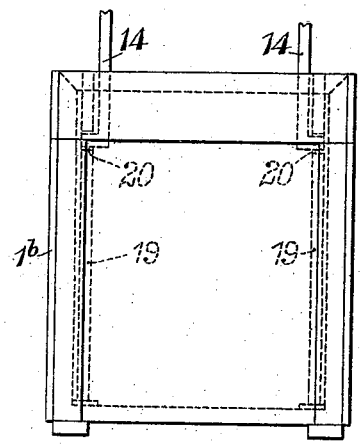
Figure 8:
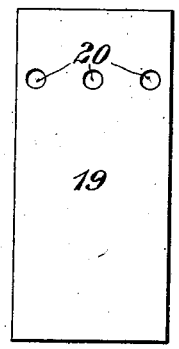
Figure 9:
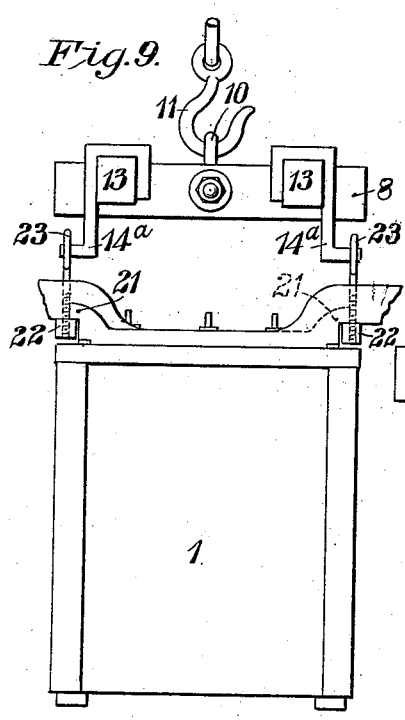
Figure 11:
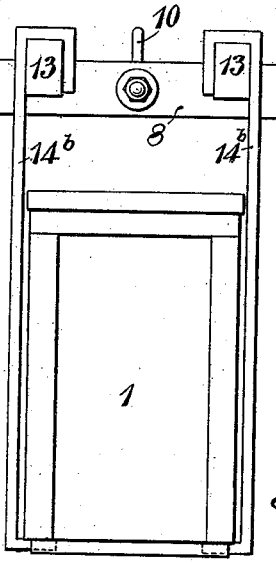
Figure 10:
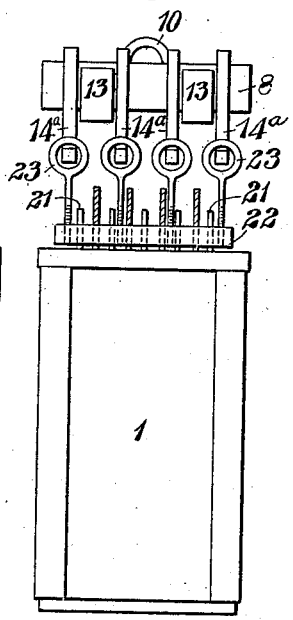

Figure 1 is a view, partially in side elevation and partially in section, of apparatus embodying my invention. Fig. 2 is a plan view of the tank shown in Fig. 1. Fig 3 is a plan view of a portion of the lifting apparatus of Fig. 1. Fig. 4 is a front elevation, and Fig. 4ª is an inverted plan view, of a device employed in connection with the lifting mechanism shown in Figs. 1 and 3. Fig. 5 is a plan view of a modified construction of the tank. Fig. 6 is a view, partially in side elevation and partially in section, of the tank shown in Fig. 5 and some of the coöperating parts. Fig. 7 is a front elevation of a tank of a modified construction, and Fig. 8 is a corresponding view of a modified form of supporting-plate for use in connection with the tank shown in Fig. 7. Figs. 9 and 10 are respectively a side and an end elevation of a tank and a modified form of plate-lifting mechanism. Fig. 11 is a side elevation of a tank and a modified form of lifting mechanism.

Referring particularly to Figs. 1, 2, and 3, the tank 1 may be made of wood and may be provided with a lead or equivalent lining 2, as is usual in apparatus of this character; but instead of having a plain uninterrupted inner surface it is provided at its upper corners with recesses or pockets 3, which may also be provided with lead or equivalent linings. These pockets are of proper dimensions to receive bars or beams 4, of plate-glass or other suitable material, the depth and thickness of which depend upon the weights which they are to support. The ends of these bars may rest upon pads of sheet-lead or other suitable material located in the bottoms of the recesses 3. The battery-plates 5 are supported on the beams 4 by means of projecting lugs 6. Between the beams 4 and the adjacent sides of the tank and extending to the bottom of the latter are sheets 7, of ordinary glass or other suitable material, which are thus located in order to prevent short circuits between the battery-plates and the lining of the tank.

In order to place the plates in position in the tank and also to lift them therefrom when desired, I provide two bars 8, of wood or other suitable material, which are rigidly fastened together by means of a bolt 9, so as to constitute, in effect, a single open beam. The bolt 9 is bent upward between the beams 8 to form a partial loop or eye 10, which may be engaged by a lifting-hook 11 on the end of a crane-chain 12. The upper sides of the beams 8 are gained to form two recesses 8ª, which receive transverse beams 13, each of which is also gained to form two recesses 13ª, which receive the beams 8. The two sets of beams are thus locked against any independent lateral or longitudinal movement, but are readily separable.

Each of the beams 13 is provided with two or more depending hooks 14 for engagement with the supporting-beams 4.

In order to remove an element from its containing-tank, a shunt is provided around it, and the cell from which the element is to be removed is disconnected by cutting the busbars at the points 15, as indicated in Fig. 1. The lifting-bars 8 are then placed on top of the element to be removed and the beams 13 placed in their operative positions, with the hooks 14 beneath the edges of the beams 4, as indicated in Fig. 1. The hoisting mechanism is now put in operation to partially lift the plates from the tank, and then the operation is stopped for the purpose of dropping a safety-strip 16 (shown in Figs. 4 and 4ª) over the beams 4 to prevent the latter from dropping from the hooks 14 during the movement of the plates by the hoisting and transferring mechanism. The element is then completely hoisted from the tank and removed by means of the crane to any desired point, where it may be placed in a separate tank for such treatment as it may require, and the hoisting and transferring mechanism may then be utilized to place a new element in the tank. This new element can be easily and quickly connected in circuit, since the joints at the points 15 are shallow and horizontal, and therefore easily connected.

By the use of this apparatus a very material saving in time and expense is effected in making renewals. The ease with which the element may be removed and replaced makes it possible to keep the cells in good condition without undue expenditure of time and money, and the small amount of material employed for supporting purposes makes this item inexpensive.

Referring now to Figs. 5 and 6, the wooden tank 1ª and the lining may be the same as the corresponding parts in Figs. 1 and 2, except that instead of providing the four pockets or recesses at the respective corners of the tank the supporting-beams 4 rest upon recesses or offsets 17, which extend completely across the ends of the tank and may be provided with suitable linings the same as are the pockets 3 in tank 1 and the interiors of both tanks 1 and 1ª.

In order to provide means whereby the lifting mechanism may be utilized in connection with this modification, two or more pockets 18, three being shown in the present case, are located below the offsets 17. These pockets or recesses may also have linings and are provided in order to permit of the insertion of the hooks 14 of the lifting mechanism underneath the supporting-beams when it is desired to remove an element from the tank, the lifting mechanism being the same as that shown in Figs. 1 and 3.

In Fig. 7 the tank 1ᵇ may be of ordinary construction and provided with the usual lining, and the lead battery plates or elements are supported upon two supports 19, formed of plate-glass or other suitable material, located, respectively, at the ends of the tank and extending to and resting upon the bottom of the same. In order that the lifting mechanism shown in Figs. 1 and 3 may be employed in connection with this construction, the supports 19 are provided with holes 20 drilled therein, the number and location being such as to adapt the plates to the use of the lifting mechanism shown in Figs. 1 and 3.

In the construction shown in Figs. 9 and 10 the elements are placed in the tank in the usual manner; but the upper ends of the plates are provided with special tail-lugs 21, beneath which may be placed bars 22 when it is desired to remove the element. To these bars are attached, preferably by means of a screw connection, eyebolts 23, the location of these eyebolts being such that the hooks 14ª of the lifting mechanism may engage therewith.

In Fig. 11 I have shown a lifting mechanism in which the long hooks 14ᵇ are employed for engaging the bottom of a tank in order that it may be lifted and moved from place to place, the lifting mechanism, except as regards the length of the hooks, being the same as that shown in Figs. 1 and 3.

Various changes may obviously be made in the materials and the details of construction of the supporting and lifting mechanism without departing from the spirit and scope of the invention, and I therefore desire it to be understood that the invention is not limited to specific details, except in so far as limitations may be imposed by the prior art and specified in the claims.

I claim as my invention—

1. A lifting-frame comprising a longitudinal beam having an eyebolt adapted for engagement by a lifting-hook, and two transverse beams provided with depending hooks and having a locking but readily-separable connection with the longitudinal beam.

2. A lifting-frame comprising a two-part beam having a bent rod or bolt, and two transverse beams provided with depending hooks and having locking but readily-separable engagement with said two-part frame.

3. A lifting-frame comprising superimposed and interlocking but readily-separable beams, hooks depending from the upper beams and a bent rod or bolt connecting the lower beams together.

4. A lifting-frame for secondary-battery elements comprising two rigidly-connected parallel beams and two independent parallel beams provided with depending hooks, said two sets of beams being gained to make an interlocking fit with each other when in operative position.

5. The combination with a secondary-battery element, a pair of supporting-beams and a tank having seats for said beams, of a lifting-frame comprising separable, interlocking beams and hooks depending from one set of beams to engage said supporting-beams.

6. In a secondary battery, a tank having recesses in its upper edge in proximity to its ends and non-conducting beams supported in said recesses and battery-plates having lateral projections which rest upon but are not attached to said beams.

7. In a secondary battery, a tank provided with recesses in its upper edge in proximity to its ends, non-conducting beams supported in said recesses, battery-plates having lateral projections which rest upon said beams and non-conducting plates between the ends of the tank and the battery-electrodes.

8. In a secondary battery, a tank provided with recesses at or near its upper edge, beams resting in said recesses and supporting the battery elements and means for lifting the beams and the elements supported thereby.

9. In a secondary battery, a tank having recesses at or near its upper edge, beams resting in said recesses and supporting the battery elements, a lifting-frame having hooks to engage said beams and safety-strips to engage the beams when lifted from the tank.

10. In a secondary battery, the combination with a tank having recesses at or near its upper edge and supporting-beams resting in said recesses, of a lifting-frame having hooks to engage said beams and safety-strips for engaging the outer sides of the beams to retain them in position on the hooks when raised from the tank.

In testimony whereof I have hereunto subscribed my name this 21st day of February, 1902.

LOUIS H. FLANDERS.

Witnesses:
　JAMES B. YOUNG,
　WESLEY G. CARR.